C. W. BELL.
MEANS FOR CHARGING STORAGE BATTERY CELLS.
APPLICATION FILED AUG. 19, 1910.
1,023,498.
Patented Apr. 16, 1912.
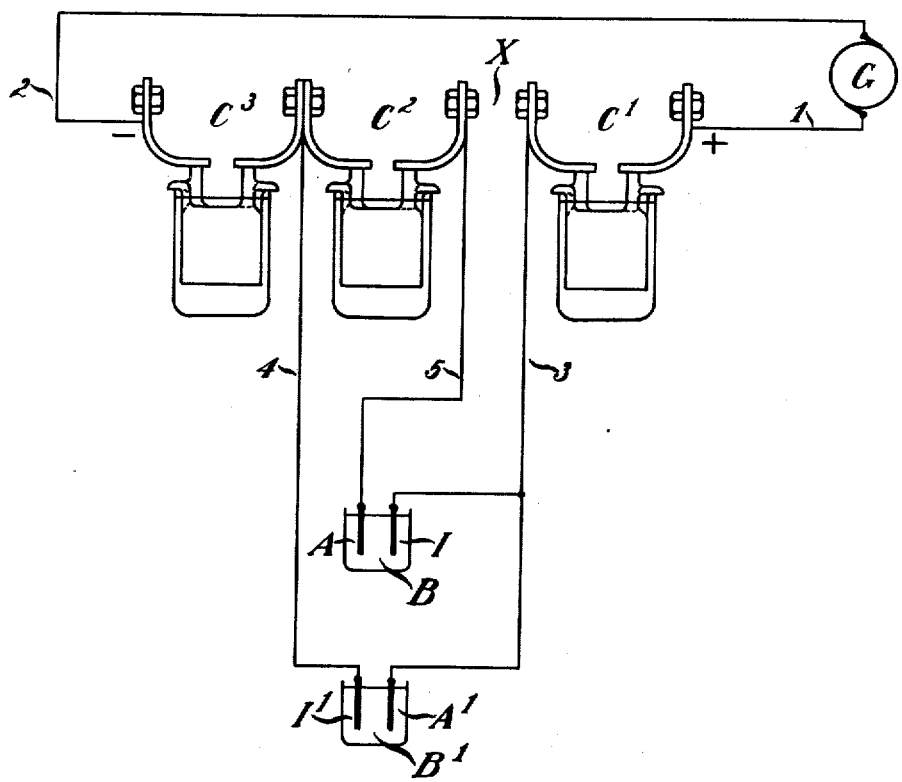
Witnesses
Inventor
Chas. W. Bell
by
Augustus B. Stoughton
Attorney

UNITED STATES PATENT OFFICE.

CHARLES W. BELL, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

MEANS FOR CHARGING STORAGE-BATTERY CELLS.

1,023,498.  Specification of Letters Patent.  Patented Apr. 16, 1912.

Application filed August 19, 1910. Serial No. 578,025.

*To all whom it may concern:*

Be it known that I, CHARLES W. BELL, a subject of His Majesty the King of Great Britain, residing in the city of Philadelphia, State of Pennsylvania, have invented certain new and useful Improvements in Means for Charging Storage-Battery Cells, of which the following is a specification.

My invention relates to systems in which a series of storage battery cells is operated in parallel with a generating source, and in which the current in the series is alternately in the charge and discharge direction. It frequently occurs that in such a system some of the cells become discharged to a lower point than the others, and it is desired to restore these low cells to an equality with the others by permitting them to receive current when in the charge direction but diverting the current from them when said current is in the discharge direction. This may be accomplished by manually operated switches provided the alternations of charge and discharge occur at infrequent and predetermined intervals. Where, however, these alterations are of frequent occurrence, and particularly where it is impossible to determine just when they are liable to occur, as, for example, when the storage battery is being utilized to regulate the fluctuations of a rapidly varying load, it becomes difficult or impossible to accomplish the results above described by manual operation.

The object of my invention is to provide automatic means for producing these results, that is, for permitting the current to pass through the low cells when that current is in the direction to charge them, but to divert the current from these cells when the current is in the discharge direction.

The nature of my invention will be more clearly understood by reference to the accompanying drawing, in which G represents a source of direct current connected by conductors 1 and 2 to the series of storage battery cells $C^1$, $C^2$ and $C^3$. The cell $C^2$ may be taken to represent a low cell, which it is desired to restore to the same state of charge as the others of the series. While this is shown as a single cell, it will be understood that it may represent a group of cells connected in series.

At X is shown an opening in the circuit between cells $C^1$ and $C^2$ into which opening is connected, by conductors 3 and 5, an electrolytic valve B which may consist of a plate of aluminium A and of iron I immersed in any suitable electrolyte such as ammonium borate. Such a cell will permit current to flow in the direction from the iron plate to the aluminium plate, but will not permit current to flow in the opposite direction. Thus, when the direction of current through the entire series of storage battery cells is in the charging direction, this electrolytic valve, if properly connected into the circuit, will permit said current to flow through the cell $C^2$. In a shunt circuit around the cell $C^2$ consisting of conductors 3 and 4, there is shown a second electrolytic valve $B^1$ which may be constructed in the same manner as described in connection with B, except that the polarity is reversed, the aluminium plate $A^1$ being connected to conductor 3 and the iron plate $I^1$ being connected to conductor 4. When the current in the series of storage battery cells is in the discharge direction, this second electrolytic valve will permit such current to flow around the cell $C^2$, while the electrolytic valve B will prevent any of said current from passing through the cell $C^2$. On the other hand when the current in the series of storage battery cells is in the charge direction, the electrolytic valve $B^1$ will prevent any portion of said current from flowing through the shunt circuit 3—4 compelling said current to pass through the cell $C^2$. Thus, the cell $C^2$ will automatically be subjected to the charging current, but will be relieved from the discharge current, and will thereby in time be brought up to the same state of charge as the rest of the series.

It will be understood that modifications may be made in the details of the invention without altering the spirit thereof, and

What I claim and desire to secure by Letters Patent is;

1. The combination with a series of storage cells of apparatus for changing the relative state of charge of a selected portion of the series comprising a device interposed in series with the selected portion, and adapted to permit a flow of current in one direction and prevent a flow in the opposite direction, and another device in shunt with the selected portion and the first named device and adapted to permit the passage of current in the direction opposed by the first named device but oppose a flow of current in the opposite direction.

2. The combination with a series of storage cells of apparatus for changing the relative state of charge of a selected portion of the series comprising an electrolytic valve interposed in series with the selected portion and adapted to permit a flow of current in one direction and prevent a flow in the opposite direction, and another electrolytic valve in shunt with the selected portion and the first named electrolytic valve and adapted to permit the passage of current in the direction opposed by the first named electrolytic valve but oppose a flow of current in the opposite direction.

3. In combination, two branch circuits in parallel relation, each containing an electrolytic valve, said valves being oppositely connected, and a series of storage cells whereof a portion is connected in one of said branch circuits while the remainder is connected in series with both branch circuits, whereby current in one direction passes through the entire series of storage cells, while current in the other direction is shunted around the portion in the branch circuit.

4. In combination, two branch circuits connected in parallel relation, automatic means for changing the proportionate division of current between them with change of direction of current flow, and a series of storage cells whereof a portion is connected in one of said branch circuits while the remainder is connected in series with both branch circuits whereby a greater proportion of the total current passes through the portion in the branch circuit in one direction than in the other.

In testimony whereof, I have hereunto signed my name.

CHAS. W. BELL.

Witnesses:
J. H. TRACY,
A. H. NAEF.